United States Patent [19]

Kouno et al.

[11] Patent Number: 5,075,158

[45] Date of Patent: Dec. 24, 1991

[54] STATIC IMAGE-DEVELOPING CARRIER AND A MANUFACTURING METHOD THEREOF

[75] Inventors: Shigenori Kouno, Tachikawa; Kenji Tsujita, Fujino, both of Japan

[73] Assignee: Konica Corporation, Tokyo, Japan

[21] Appl. No.: 448,359

[22] Filed: Dec. 11, 1989

[30] Foreign Application Priority Data

Dec. 13, 1988 [JP] Japan ................................ 63-314160

[51] Int. Cl.[5] ................................................ B32B 9/00

[52] U.S. Cl. .................................... 428/220; 428/195; 428/212; 428/323; 428/327; 428/328; 428/329; 428/411.1; 428/694; 430/108; 430/110; 427/355; 264/109; 264/122

[58] Field of Search ................ 430/108, 110; 428/195, 428/323, 212, 327, 328, 329, 411.1, 694, 220; 427/355; 264/109, 122

[56] References Cited

U.S. PATENT DOCUMENTS 4,695,524 9/1987 Knapp et al. ........................ 430/110

4,816,364 3/1989 Oishi et al. .......................... 430/108

FOREIGN PATENT DOCUMENTS 0226310 6/1987 European Pat. Off. .

134467 5/1989 Japan .

OTHER PUBLICATIONS

IBM Technical Disclosure Bulletin, vol. 24, No. 1B, Jun., 1981, Abstract of Japanese Patent Publication No. 63-235961.

*Primary Examiner*—Patrick J. Ryan

*Attorney, Agent, or Firm*—Finnegan, Henderson, Farabow, Garrett, and Dunner

[57] ABSTRACT

There is disclosed the method of preparing a carrier for developing a static latent image, wherein the carrier comprises a mixture of a core matrial and two or more kinds of the resin particles having different impact strengths. The method comprises applying an impact force repeatedly to said mixture to thereby fix the resin particles on the core material.

13 Claims, 1 Drawing Sheet

STATIC IMAGE-DEVELOPING CARRIER AND A MANUFACTURING METHOD THEREOF

FIELD OF THE INVENTION

The present invention relates to a carrier for developing electrostatic image and to a manufacturing mathod thereof.

BACKGROUND OF THE INVENTION

Two-component type developer comprising a toner and a carrier has the advantages that a polarity and a charge amount of the toner can be controlled to some extent and that the selection of color for the toner can be widened.

In this kind of a developer, a carrier is composed of a core material covered with a resin in order to control frictional electrification, prevent deterioration of the carrier and damage to the surface of a photoreceptor, lengthen a shell-life of the developer and maintain quality of a copied image.

In a high speed copier developed recently for repeated and frequent use, an overcoat layer for covering the carrier is liable to be easily peeled off and enable no prescribed effects to be achieved. Therefore, in order to improve an abrasive resistance of a resin layer, there are proposed the methods in which a thicker layer is provided and in which an overcoat layer is strengthened by mixing therein grains less liable to be abraded (a filler), disclosed in Japanese Patent Publication Open to Public Inspection No.73631/1985.

However, a thicker layer is liable to increase a production time in a production process and decrese a yield in a grain-forming step.

A spray coating method and a dipping method are used in order to incorporate a filler into an overcoat layer. It is difficult, however, to disperse the filler stably in a resin solution, and an abrasive property and a friction electrification are varied to a large extent by lot. Besides, the isolated fillers stick to a photoreceptor and damage it, which in turn results in causing a deteriorated image, fogging and inferior cleaning. Further, the filler itself is liable to generate a spent.

In the method where an impact force is repeatedly applied to a mixture of a core material and a resin particle to thereby cover the core material with the resin particle, it is possible to increase a layer thickness of a carrier by increasing the size of the resin particle and the impact force to thereby increase an amount of the resin coated on the carrier by one dry coating. However, it is difficult to make a uniform layer by this method. Further, where ferrite is used for the core material, the increased impact force causes abrasion and crush, so that the carriers having different particles sizes are liable to be formed and a sieving process is necessary for removing generated fine particles.

SUMMARY OF THE INVENTION

The object of the invention is to provide a static image-developing carrier and the manufacturing method thereof in which an abrasive property is improved without badly affecting an image quality, and a particle-forming time can be reduced.

The above object can be achieved by a static image-developing carrier which is formed by applying repeatedly an impact force in a dry condition to a mixture of a core material and two or more kinds of resin particles having different Izod impact strengths to thereby fix the resin particle on the core material.

Figure 1:
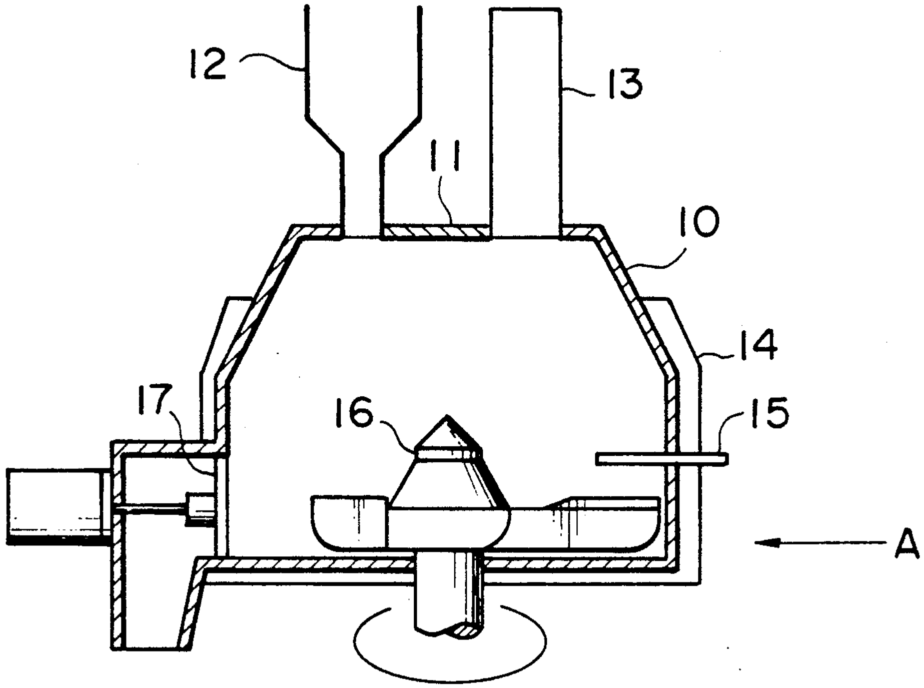
FIG. 1 represents a cross section showing a constitution of a dry coating apparatus.

10: Main vessel
11: Upper lid
12: Inlet for loading raw material
13: Bug filter
14: Jacket
15: Thermometer
16: Main mixing fan
17 Outlet for product

DETAILED DESCRIPTION OF THE INVENTION

The resin particles used in the present invention may be of any kinds so long as they are of two or more kinds. Hereunder, the case where two kinds of the resin particles are used will be explained.

The mixture specified in the present invention comprises the core materials having there on the resin particles with different Izod impact strengths. The resin particle having a smaller Izod impact strength and ones having a larger Izod impact strength may be sticked simultaneously or separately, so long as the resin particles sticks to the core materials before an impact force is applied repeatedly in a dry condition.

The resin particles sticking to the core materials are fixed on the core materials by receiving an impact force, and the resin particles having a smaller Izod impact strength collide with the resin particles having a larger Izod impact strength as the impact force is applied, where by the coating layer having a minute resin layer and a large layer strength is formed, so that the coating layer is not readily peeled off even in a repeated and prolonged use. A mixing ratio of the having a larger Izod impact strength is varied according to the kinds of a carrier. Normally, more resin particles having a smaller Izod impact strength is involved because the resin particles having a smaller Izod impact strength can be fixed more uniformly on the core materials than the resin particles having a larger Izod impact strength and can form an excellent layer with the impact force applied.

The difference of not less than 2 kg cm/cm between Izod impact strengths of the resin particles makes the coating layer finer.

In the present invention, there are used preferably the resin particles having an Izod impact strength of not more than 3 kg cm/cm and the resin particles having that of not less than 5 kg cm/cm.

It is difficult to fix the resin particles having not less than 3 kg cm/cm of the Izod impact strength on the core materials to form an excellent coating layer. The resin particles having not more than 5 kg cm/cm does not promote the fineness of the coating layer even in colliding with the resin particles sticking to the core materials.

The Izod impact strength is measured according to the test method JIS-K7110. This value represents a toughness and a brittleness, and is measured by giving an impact to a test piece to break it.

The resin particles used in the present invention are made of a styrene type resin (a styrene homopolymer, a copolymer of styrene and alkyl methacrylate), an epoxy type resin (a copolymer of bisphenol A and epichrolohydrine), an acrylic resin (polymethyl methacrylate), a polyolefine resin (a polyethylene type resin, LDPE, a polybutadiene type resin), a polyurethane resin (a polyester-polyurethane resin), a nitrogen containing vinyl copolymer (polyvinylpyridine), a polyester resin, a polyamide resin (6 nylon, 66 nylon), polycarbonate, a cellulose derivative (nitrocellulose, alkylcellulose), a silicone resin, and a fluorinated resin.

Among them, preferable ones having an Izod impact strength value of not more than 3 kg cm/cm are a styrene resin, an acrylic resin, an epoxy resin and a polyester resin.

The resin particles having an Izod impact strength value of not less than 5 kg cm/cm are made preferably of a fluorinated resin, a polyethylene type resin, a polypropylene type resin, a cellulose derivative, a polyurethane resin, polycarbonate, and polyamide resin. Especially, the fluorinated resin particle is preferable.

A manufacturing apparatus capable of applying an impact force repeatedly in a dry condition includes an impact type surface reforming apparatus, a hybriiiidizer (manufactured by Nara Machine Manufacturing Co., Ltd), Mechanomill (Okada Seiko Co., Ltd). A high speed agitating type mixing machine includes a laboratory matrix (Nara Machine Manufacturing Co., Ltd), a heavy duty matrix (Nara Machine Manufacturing Co., Ltd), a vertical granulator (Fuji Industry Co., Ltd), a spiral flow coater (Freunt Co., Ltd), New Malmerizer (Fuji Powdal Co., Ltd), and a turbular shaker mixer (Shinmaru Enterprise Co., Ltd).

Figure 2:
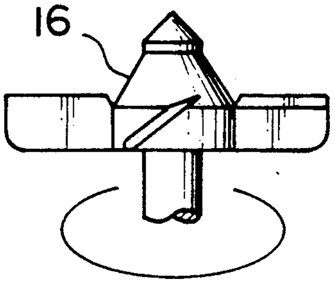
FIG. 2 represents a figure of the main mixing fan viewed from an A direction.

The high speed agitating type mixer used for dry coating is shown in FIG. 1 and FIG. 2, wherein 10 represents a main vessel; 11 represents an upper lid; 12 represents an inlet for loading a raw material; 13 represents a bug filter; 14 represents a jacket; 15 represents a thermometer; 16 represents a main mixing fan consisting of three fans; and 17 represents an outlet for product.

In this apparatus; the mixture of the core materials and the resin particles loaded from the inlet 12 collide with each other and the fan while mixed and dispersed by the fan 16, whereby an impact force is applied so that the resin particles are spread and fixed on the surfaces of the core materials.

The impact force is repeatedly applied preferably at the temperature at which the resin particles do not melt. Especially, it is applied preferably at the temperature range having an upper limit of 50° C. higher than a glass transition point of the resin particles.

The temperature is measured by the thermometer 15.

The temperature exceeding the glass transition point of the resin particles by more than 50° C. increases an adhesion of the resin particles, so that resin particles coagulate each other to lumps. Further, a higher temperature expedites binding of the core materials themselves via the resin particles to thereby form particles, and once the temperature reaches where the resin particles start melting, it becomes difficult to coat the resin particles uniformly on the surfaces of the core materials.

The above temperature is represented by an average value of an approximate surface temperature of the particles comprising the core materials having there on the resin particles; the temperature is measured by inserting a temperature measurement probe into the main vessel in which the particles flow by applying an impact force with a fan and contacting the particles randomly to the probe. The temperature measurement probe is composed of a thermo couple and a temperature measuring resistence, and the temperature can be measured by measuring an electromotive force and a resistance electrically. The thermo couple includes a chromel-alumel thermo couple.

In the present invention, there is used the chromel-almel thermo couple (length : 10 cm, diameter: 6.4 mm) T-40-K-2-6,4-100-U-304-KX-G-3000 having stainless cover, manufactured by Hayashi electric Industry Co., Ltd (SUS304). The probe is inserted parallel to the bottom surface of the main vessel from the position of $\frac{1}{3}$ height of the main vessel to the center of the main mixing fan so that its point is in the position of $\frac{1}{3}$ of the length of the main mixing fan.

A glass transition point Tg can be measured by "DSC-20" (manufactured by Seiko Electron Industry Co., Ltd) in accordance with the differencial scanning calorimetry measuring method (DSC). To be concrete, a sample of about 10 mg is heated at a constant temperature-rising speed (10° C./min.), and Tg is obtained from a crossing point of a base line and a gradient of a heat absorbing curve.

The core materials for the carrier used in the present invention include inorganic powder such as glass bead, aluminum powder, metal powder such as iron powder and nickel powder, ferrous oxide, metal oxide powder such as ferrous oxide, ferrite and magnetite, organic metal powder such as carbonium ferrous powder, and the materials used as a core material for a conventional coated carrier.

Among them, the carrier using ferrite as a core material is prefersable especially because high image quality and durability can be provided. However, ferrite is liable to be subjected to abrasion and breakage by an impact force in a dry coating. In the present invention, as the impact force can be controlled, the dry coating can be carried out without causing abrasion and breakage.

In the present invention, there is used preferably the core material having a specific resistance of not more than $1 \times 10^{11}$ Ωcm, and more preferably not more than $1 \times 10^{8}$ Ωcm.

In the present invention, such magnetic powder as iron powder and ferrite powder is especially preferable.

Ferrite means herein a magnetic oxide containing iron, and is not limited to spinel type ferrite shown by a formula, $MOFe_2O_3$, wherein M represents diequivalent metal such as nickel, cupper, zinc, manganese, magnesium and lithium.

Ferrite preferably used as the core material may be amorphous, and is preferably spherical. The weight average particle size of ferrite is 20 to 200 μm, and more preferably 30 to 120 μm. It is difficult to form a resin layer by the particles not larger than 20 μm, and those not smaller than 200 μm is liable to provide a coarse image.

The mixture ratio of ferrite and the resin particle is partly dependent on a specific gravity of ferrite, and it is preferably 100:1 to 100:10.

The impact force applied to the mixture may be at such level that ferrite is not abraded or crushed and the resin particle is not broken.

Ferrite having a weight average particle size of 20 to 200 μm is used. The too small weight average particle size makes the formed carrier so small that it easily sticks to a latent image carrier, which results in a deteriorated image, the too large weight average grain size makes the carrier so small that a specific surface area becomes small. As the result, the cost of the manufacturing facilities increases due to strict control of a toner concentration, which is necessary for a proper frictional electrification of the toner, and in addition, it becomes difficult to carry uniformly and densely the coated carrier on the developer carrier, which results in an unstable amount of toner sticking to the carrier conveyed to a developing chamber and in an inferior development and a deteriorated image. The sphericity of ferrite is preferably not less than 0.70. The coated carrier with a high sphericity is formed by such a magnetic particle as having a high sphericity and therefore can have an improved fluidity, which results in capability of conveying stably a proper amount of the toner to the developing chamber and in achieving an excellent development.

The sphericity is defined as the following equation:

$$\text{Sphericity} = \frac{\text{Circumferencial length of a circle having the same area as a projected area of a particle}}{\text{Contour length of projected image of a particle}}$$

This sphericity can be measured by the image analysis apparatus (manufactured by Japan Abionix Co., Ltd).

The too large weight average grain size of the resin particle makes it difficult to spread the resin particle on the surface of the core material and carry out a dry coating processing.

The weight average size is measured by "Micro track" (Leads & Northrup Co., Ltd., TYPE7981-OX) in a dry condition.

The toner particles used with the carriers of the present invention are positively or negatively chargeable toner particles containing positively or negatively chargeable resin and/or a colorant.

The weight ratio of the carrier to the toner particle is preferably 1:99 to 10:90, and more preferably 2:98 to 8:92.

The carrier and the toner particle can be mixed by conventional methods.

As can be understood from the above description, the present invention is characterized by that an impact force is applied repeatedly in a dry condition to the mixture of the core materials and two or more kinds of the resin particles having different Izod impact strengths to thereby fix the resin particles on the core materials.

In the invention, the resin particles sticking to the core materials receive an impact force from the resin particles having a different impact strength and are rearranged while moving on the core materials or deforming. The resin particles are fixed with the core materials or the adjacent resin particles, and a deformed part is pressed to a gap so that the coating layer becomes minute.

Thus, the layer formation by the resin particles on the core materials are promoted, where by the layer formation time is shortened. Besides, the layer strength is increased, and there can be prepared the carrier having an excellent durability and less liable to cause a deterioration of an image quality.

Further, ferrite used as the core material is neither abraded nor broken because less impact force may be applied due to an easier layer formation.

EXAMPLE

Hereunder, the present invention is explained in more detail by the reference of the examples.

Preparation of Carrier

Example 1

There were mixed 100 weight parts of spherical ferrite particles having an average particle size of 120 μm, 15 weight prts of copolymer particles of methylmethacrylate, butylacrylate and butylmethacrylate (Izod impact strength: 1.3 kg cm/cm, glass transition point: 71° C., average particle size: 0.06 μm), and 4 weight parts of polytetrafluoroethylene particles (Izod impact strength: 10.1 kg cm/cm, average particle size: about 0.3 μm), to thereby prepare the mixture of ferrite and the resin particles sticking thereon uniformly.

An impact force was applied repeatedly to the above mixture by the high speed agitating type mixer to form a coating layer and the mixture was cooled to thereby prepare the carrier coated with resin. Fused particles were not generated.

In Table-1, the used materials were shown, wherein resin particle-1 has a smaller Izod impact strength, and resin particle-2 has a larger Izod impact strength.

Example 2 to 5

Example 1 was repeated except that the materials used were changed as shown in Table-1.

Comparative Example 1 to 5

Example 1 was repeated except that the resin particles having a larger Izod impact strength in Examples 1,2 and 5 were removed in Comparative Examples 1,2 and 3 and that the resin particles having a larger Izod impact strength in Examples 2 and 5 were removed in Comparative Examples 4 and 5.

After the mixture was put into the high speed agitating mixer, sampling was carried out periodically and the amount of charging (Q/M value) was calculated by the blow-off method. The time when the value was saturated was shown in Table-1 as the layer formation time.

TABLE-1

| Example | | Inv. 1 | Inv. 2 | Inv. 3 | Inv. 4 | Inv. 5 | Comp. 1 | Comp. 2 | Comp. 3 | Comp. 4 | Comp. 5 |
|---|---|---|---|---|---|---|---|---|---|---|---|
| Resin particle-(1) | Izod impact strength (kg cm/cm) | 1.3 | 3.0 | 3.3 | 1.3 | 1.2 | 1.3 | 3.0 | 1.2 | — | — |
| | Resin | Copolymer of methylmethacrylate, butylacrylate and | Polymethyl methacrylate | Epoxy resin | Copolymer of methylmethacrylate, butylacrylate and | Copolymer of methylmethacrylate and styrene | Copolymer of methylmethacrylate, butylacrylate and | Polymethyl methacrylate | Copolymer of methylmethacrylate and styrene | — | — |

TABLE-1-continued

| Example | | Inv. 1 | Inv. 2 | Inv. 3 | Inv. 4 | Inv. 5 | Comp. 1 | Comp. 2 | Comp. 3 | Comp. 4 | Comp. 5 |
|---|---|---|---|---|---|---|---|---|---|---|---|
| | | butylmethacrylate | | | butylmethacrylate | | butylmethacrylate | | | | |
| | Glass transition point Tg (°C.) | 71 | 122 | 82 | 71 | 106 | 71 | 122 | 106 | — | — |
| | Average particle size (μm) | 0.06 | 0.06 | 0.1 | 0.06 | 0.06 | 0.06 | 0.06 | 0.06 | — | — |
| Resin particle-(2) | Izod impact strength (kg cm/cm) | 10.1 | 5.0 | 10.1 | 4.5 | 20.5 | — | — | — | 5.0 | 20.5 |
| | Resin | Polytetrafluoroethylene | Nylon | Polytetrafluoroethylene | Copolymer of ethylene and propyrene | Polyfluorovinydeline | — | — | — | Nylon | Polyfluorovinydeline |
| | Average particle size (μm) | About 0.3 | About 0.5 | About 0.3 | About 0.5 | About 0.3 | — | — | — | About 0.5 | About 0.3 |
| Core material | Compound | Spherical ferrite | About 0.5 | About 0.3 | About 0.5 | About 0.3 | — | — | — | About 0.5 | About 0.3 |
| | Average particle size (μm) | 120 | About 0.5 | About 0.3 | About 0.5 | 80 | 120 | — | 80 | 120 | 80 |
| Weight ratio resin particle-1: resin particle-2: core material | | 15:4:100 | About 0.5 | About 0.3 | About 0.5 | 20:5:100 | 15:0:100 | 15:0:100 | 20:0:100 | 0:4:100 | 0:5:100 |
| Layer formation time (min) | | 5 | 10 | 15 | 15 | 5 | 20 | 45 | 25 | 75 | No formation |

Preparation of Developer

To 100 weight parts of the carriers prepared in Example 1, Comparative Examples 1 and 4, 3.5 weight parts of toner for U-BiX 3042 (manufactured by KONICA CORPORATION) were mixed to prepare the developers.

Further, to 100 weight parts of the carriers prepared in Example 5 and Comparative Example 5, 5 weight parts of toner for U-BiX were mixed to prepare the developers.

Evaluation of Developers

The above developers were subjected to an operating test of 100,000 copies under 33° C. RH and 80% with a modified model of U-BiX 3042 to evaluate an amount of electrification, a coating rate and a copying durability in zero, 50,000 and 100,000 copies.

The result is shown in Table 2.

The amount of electrification is a frictional electrification per one gram of a developer, measured by the blow-off method.

The coating rate was calculated by the weight method in which a resin coating layer was dissolved with methyl ethyl ketone. Unsoluble resin particle was separated from a core material and included in a coating amount.

The coating rate was calculated according to the following equation:

$$\text{Coating rate} = \frac{\text{Weight of dissolved resin}}{\text{Weight of coated carrier}} \times 100$$

The durability is represented by number of copies in which a value of fog in developing increases to 0.3 or more, or a Dmax value decreases to 0.7 or less. The level of 50,000 or more in the number of copies indicates that the values of both fog and Dmax have not reached the above limitations even after 50,000 copying.

TABLE-2

| Example | | Inv. 1 | Inv. 5 | Comp. 1 | Comp. 3 | Comp. 4 |
|---|---|---|---|---|---|---|
| Zero copy | Amount of electrification (Q/M) (μc/g) | −20.5 | −23.5 | −20.2 | −23.0 | −21.0 |
| | Coating rate (wt %) | 1.59 | 2.00 | 1.30 | 1.66 | 1.21 |
| 50,000 copies | Amount of electrification (Q/M) (μc/g) | −21.0 | −23.0 | −18.4 | −19.5 | −9.2 |

TABLE-2-continued

| Example | | Inv. 1 | Inv. 5 | Comp. 1 | Comp. 3 | Comp. 4 |
|---|---|---|---|---|---|---|
| | Coating rate (wt %) | 1.59 | 1.99 | 1.06 | 1.24 | 0.82 |
| 100,000 copies | Amount of electrification (Q/M) (μc/g) | −20.2 | −23.8 | −12.6 | −10.4 | — |
| | Coating rate (wt %) | 1.58 | 2.01 | 0.81 | 0.76 | — |
| Durability | | Not less than 100,000 sheets | 2.01 | 90,000 sheets | 80,000 sheets | 20,000 sheets |

As is apparent from Table-1, the layer formation time of the examples of the invention in which there are used the resin particles having different Izod impact strengths is shortened much more than that of the comparative examples.

Especially, the layer formation time of the carriers of Examples 1 and 5 is remarkably shortened, in which there are used the resin particles having the Izod impact strength differences of 8.8 kg.cm/cm and 19.3 kg.cm/cm, respectively.

As is apparent from Table-2, the electrification amount and coating rate of Example-1 and 5 do not change and have an excellent durability and abrasion resistance without causing deterioration of an image quality, even after a prolonged use.

What is claimed is:

1. A carrier for developing a static latent image, comprising a mixture of a core material and two or more kinds of resin particles having a difference of impact strengths of 2 kg cm/cm or more, wherein when an impact force is applied repeatedly to said mixture said resin particles are fixed on said core material.

2. The carrier of claim 1, wherein one of said resin particles has an impact strength of 3 kg cm/cm or less and another has an impact strength of 5 kg cm/cm or more.

3. The carrier of claim 2, wherein the resin particles having an impact strength of 3 kg cm/cm or less are made of a styrene resin, an acrylic resin, an epoxy resin or a polyester resin.

4. The carrier of claim 2, wherein the resin particles having an impact strength of 5 kg cm/cm or more are made of a fluorinated resin, a polyethylene resin, a polypropylene resin, a cellulose derivative, a polyurethane resin, a polycarbonate resin, or a polyamide resin.

5. The carrier of claim 4, wherein said resin particles are made of a fluorinated resin.

6. The carrier of claim 1, wherein said impact force is applied at a temperature range having an upper limit 50° C. higher than a glass transition point of the resin particles.

7. The carrier of claim 1, wherein said core material has a specific resistance of $1\times10^{11}$ Ω.cm or less.

8. The carrier of claim 7, wherein said core material has a specific resistance of $1\times10^{8}$ Ω.cm or less.

9. The carrier of claim 1, wherein said core material is ferrite.

10. The carrier of claim 1, wherein said core material has a weight average particle size of 20 to 200 μm.

11. The carrier of claim 10, wherein said weight average particle size is 30 to 120 μm.

12. The carrier of claim 1, wherein said core material has a sphericity of 0.70 or more, said sphericity being represented by the following equation:

$$\text{Sphericity} = \frac{\text{Circumferencial length of a circle having the same area as a projected area of a particle}}{\text{Contour length of projected image of a particle}}$$

13. A method of preparing a carrier from a mixture of a core material and two or more kinds of resin particles having different impact strengths, comprising applying an impact force repeatedly to said mixture to thereby fix said resin particles on said core material.

* * * * *